United States Patent [19]
Sakai

[11] Patent Number: 5,377,098
[45] Date of Patent: * Dec. 27, 1994

[54] METHOD AND APPARATUS FOR COMPILING DATA RELATING TO DAMAGE EXTENT, PANEL AND CHASSIS MEMBER RECTIFICATION WORK, PAINTING WORK AND COSTS

[75] Inventor: Nobuhiro Sakai, Yokosuka, Japan

[73] Assignee: Nissan Motor Co., Ltd., Yokohama, Japan

[*] Notice: The portion of the term of this patent subsequent to Mar. 8, 2011 has been disclaimed.

[21] Appl. No.: 315,635

[22] Filed: Feb. 27, 1989

[30] Foreign Application Priority Data

| Feb. 26, 1988 | [JP] | Japan | 63-42135 |
| Feb. 26, 1988 | [JP] | Japan | 63-42136 |
| Sep. 22, 1988 | [JP] | Japan | 63-236231 |

[51] Int. Cl.$^5$ .................................... G06F 15/02
[52] U.S. Cl. ............................. 364/406; 364/401; 364/464.01
[58] Field of Search ............ 364/464.01, 406, 401; 72/205, 12, 6

[56] References Cited

U.S. PATENT DOCUMENTS

| 4,435,769 | 3/1984 | Nagano et al. | 364/464.07 |
| 4,507,872 | 4/1985 | Schermann | 33/760 |
| 4,811,250 | 3/1989 | Steber et al. | 72/705 |
| 4,899,292 | 2/1990 | Montagna | 364/521 |

FOREIGN PATENT DOCUMENTS 3110788 2/1982 Germany .................. 364/464.01

Primary Examiner—Roy N. Envall, Jr.
Assistant Examiner—A. Bodendorf
Attorney, Agent, or Firm—Foley & Lardner

[57] ABSTRACT

The amount of time required to perform panel beating and/or repainting and like repair work is estimated by sequentially compiling data which indicate which panel is damaged, the degree of the damage, the degree of repair difficulty and the area thereof. The compliation is made firstly for large deformations, then for intermediate damages. After this, in the case of sections wherein the damage is considered as being small, the area data alone is compiled. This large intermediate and small data is compiled for each of the damaged panels and converted into time and used in combination with labor rates and/or materials costs, to estimate the cost of the repair. Other embodiments feature the compilation of repainting data including painting and undercoating of panels which define the chassis and/or form part of the vehicle compartments and the like. Inclusion of the time to check wheel alignment and the like in the case where the chassis has been twisted or warped after the panels involved have been repaired is included in an embodiment directed to structural members and panels which are not normally seen from outside of the vehicle.

8 Claims, 7 Drawing Sheets

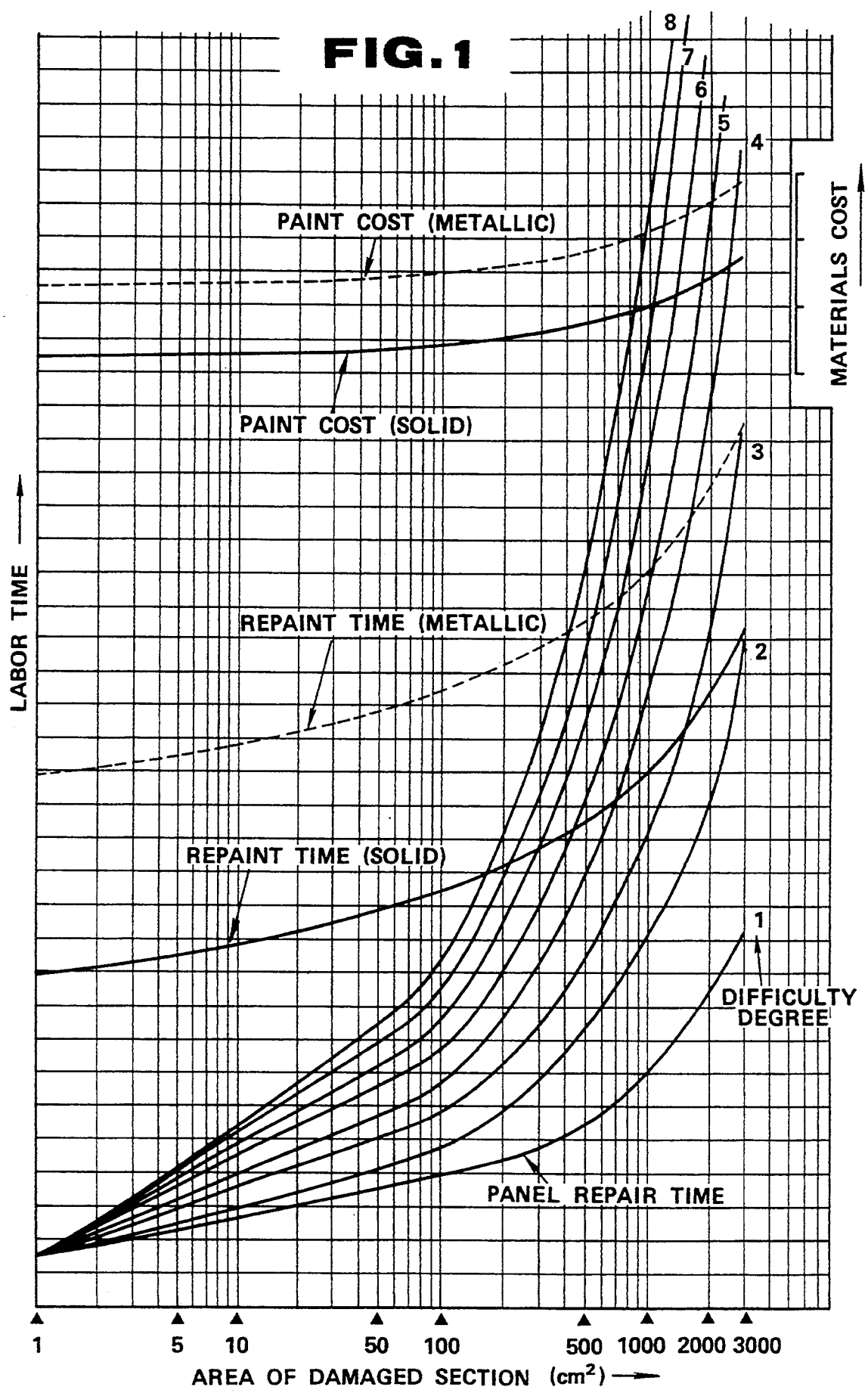

METHOD AND APPARATUS FOR COMPILING DATA RELATING TO DAMAGE EXTENT, PANEL AND CHASSIS MEMBER RECTIFICATION WORK, PAINTING WORK AND COSTS

BACKGROUND OF THE INVENTION

1. Field of the Invention

The present invention relates to a method and an apparatus for facilitating the compilation of data relating to the extent and cost of repairing a vehicle body which has been damaged in a collision or similar type of accident, and more specifically to a method and arrangement which takes into account the amount of work involved in the rectification, repair and repainting of the existing panels, which does not just consider replacement of the same, and which is extremely portable enabling its use in a pocket type hand-held computer.

2. Description of the Prior Art

In the event of a collision or the like which results in damage to panels and/or structural members of a vehicle body, it is very often required that an estimate for the repairs of the same be produced on the spot (viz., on the scene of the accident and/or within a short period of time of the vehicle being being towed or otherwise moved to a garage or body shop for repair.

In order to generate such an estimate, it is usual for a worker skilled in the art to move about the vehicle making notes and reference to a chart of the nature shown in FIG. 1 of the drawings.

However, as will be appreciated from this figure, the schedule is, in order to be effective, quite complex and is arranged in terms of required work time (man hours) and damage panel surface area. The extent of the damage and the effect on the length of time required to rectify and/or repair the panels is charted in 8 levels of difficulty. The re-painting work and type and amount of paint (metallic, solid etc.) are also charted in the illustrated manner.

In order to utilize this type of chart it is firstly necessary to inspect each of the damaged sections and approximate the deformed area thereof and the degree of difficult in repairing the same. Using these two values, the vertical lines of the chart are followed upwardly from the bottom of the chart from the approximate value until the appropriate difficulty degree is reached. By reading across to the left of the chart, an approximate time required for the panel beating and repair work can be obtained.

Following this, the amount of time required to repaint the section is calculated by determining the type of paint work involved (e.g. metallic or solid), and finding the intersection of the appropriate traces with the line of difficult selected previously. By reading across to the left of the chart, this value can be ascertained.

The two time periods are then summed and multiplied by the current labor rate to derive the repair cost data. Following this, the cost of the paint is determined by using the traces provided in the upper section of the schedule and reading across the right of the same.

The two costs are then summed to derive the cost estimate for the given damaged section.

The procedure is then repeated for each of the remaining damaged sections in the event that a plurality of separate deformations exist.

However, due to the complexity of the chart it has been found impracticable for the same be printed on anything less than an A4 size sheet. As carrying such a piece of paper, even when enclosed in a protective transparent cover, is both difficult and troublesome, especially when a lot of note taking and calculations are required, it usual to print the chart on a large sheet of paper and hang it on a wall in a suitable position. However, as garages and repairs shops are often subject to relative poor organization due to the very nature of their business and the urgency with which vehicles are often brought in and demands subsequently made for a quick repair estimate, the operator making the inspection and producing the estimate is often forced to turn, stretch or peer from a relatively long distance, to see the chart. This of course adds to the operator's fatigue and in some instances leads to erroneous calculations being performed.

In addition to this, the estimates produced by different operators tend to vary by an unacceptably large degree. This can be in part attributed to the relatively large number of assumptions and decisions which have to be mentally manipulated.

U.S. Pat. No. 4,435,769 issued on March 6, in the name of Nago et al, discloses a portable arrangement wherein lists of parts data are recorded on cassette tape. This arrangement however, has only taken simple replacement of parts into consideration and is both bulky and heavy (disclosed as being about 10 Kg). Further, a number of tapes are required in order to provide sufficient data to cover a number of different vehicle makes and types.

Accordingly, this device has not proven of any use when considering the repair and painting of existing panels and at 10 Kg has not proven to be sufficiently handy to enable the device to be hand held, as is clearly required in crowded and soiled environment of a body shop and/or at the actual site of an accident wherein a table or similar type of stand is inevitably not available.

A further attempt to improve the ease with which panel beating estimates can be derived has been proposed in an article published in the National Underwriter (Property/Casualty) Vol. 87 No. 43 page 46, on Oct. 28, 1983. This arrangement has proposed a chart which displays the various part of the vehicle in exploded form (about 4000 parts) and which can be selectively checked off as the operator "walks the car" (viz., moves methodically about the vehicle).

Following this, the chart is taken to a computer terminal and the data is typed in and subsequently transmitted to a remote central main frame type computer wherein appropriate calculations are made. The outcome of the computations are then relayed back to the operator's terminal.

Apart from requiring both a very expensive terminal and main frame system, this arrangement also requires the preparation of about 600 different charts in order to suitably cover a suitable spectrum of vehicle makes and types. In addition to this, only replacement is considered and data relating to actual repair of existing damaged panels is not calculated nor rendered any easier to derive.

SUMMARY OF THE INVENTION

It is an object of the present invention to provide an arrangement which can enable data relating to repair and re-painting of existing damaged panels and structural members to be readily compiled and used to determine the amount of time, materials and costs required to actually implement repair of the damage.

It is a further object of the invention to provide an arrangement which can be hand held during actual use and which is very readily transported from place to place without inducing physical fatigue.

In brief, the above objects are achieved by an arrangement wherein, in a basic embodiment of the invention, the amount of time required to perform panel beating and/or repainting and the like rectification work is estimated by sequentially compiling data which indicate which panels are damaged, the degree of the damage, the degree of repair difficult and the area thereof. The compilation is made firstly for large deformations, then for intermediate damages. After this, in the case of sections wherein the damage is considered as being small, the area data alone is compiled. This large-intermediate-small data is converted into time and used in combination with labor rates and/or materials costs, to estimate the cost of the repair. Other embodiments feature the compilation of repainting data including painting and undercoating of panels which define the chassis and/or form part of the vehicle cabin and the like.

Inclusion of the time to check wheel alignment and the like in the case where the chassis has been twisted or warped after the panels involved have been repaired, is included in an embodiment directed to structural members and panels which are not normally seen from outside of the vehicle.

More specifically, a first embodiment of the present invention is deemed to comprise a method of generating repair data for a body having damaged panels and/or structural members, the method featuring the steps of: generating first display signals which are supplied from a display control circuit to a display screen, the first display signals inducing messages to appear on the screen prompting the input of various data; inputting first data signals to a processing circuit relating to the damage extent in response to a first message displayed on the screen, the damage extent input signals including the separate input of data signals pertaining to large, intermediate and small deformations of each member which is deformed; inputting second data signals to the processing circuit indicative of the degree of difficulty of each of the members in response to a second message displayed on the screen; inputting third data signals to the processing circuit indicative of the area of each of the large, intermediate and small deformations in response to a third message displayed on the screen; processing the inputted first, second and third data signals using to derive a signal indicative of the length of time required to effect the repairs; inputting a fourth signal indicative of the current labor rate to the processing circuit in response to a fourth message displayed on the screen; using the inputted labor rate signal in combination with the time indicative signal to generate a signal indicative of the cost of effecting the repairs; generating a display control signal which is supplied from the processing unit to a display screen, the display control signal inducing the calculation results to appear.

A second aspect of the present invention is deemed to comprise a method of generating repair data for a body having damaged panels and/or structural members, which features the steps of: generating first display signals which are supplied from a display control circuit to a display screen, the first display signals inducing messages to appear on the screen prompting the input of various data; inputting first data signals to a processing circuit relating to the damage extent in response to a first message displayed on the screen, the damage extent input signals including the separate input of data signals pertaining to large, intermediate and small deformations of each member which is deformed; inputting second data signals to the processing circuit indicative of the degree of difficulty of each of the members in response to a second message displayed on the screen; inputting third data signals to the processing circuit indicative of the area of each of the large, intermediate and small deformations in response to a third message displayed on the screen; inputting a fourth data signal indicative of the amount of time checking and measuring of the rectification work will take to ensure that the required degree of repair has been attained; processing the inputted first, second third and fourth data signals using to derive a signal indicative of the length of time required to effect the repairs; inputting a fourth signal indicative of the current labor rate to the processing circuit in response to a fourth message displayed on the screen; using the inputted labor rate signal in combination with the time indicative signal to generate a signal indicative of the cost of effecting the repairs; generating a display control signal which is supplied from the processing unit to a display screen, the display control signal inducing the calculation results to appear.

A third aspect of the present invention is deemed to comprise a method of generating repair data for a vehicle body having damaged members in a device comprising: display means, the display means having a screen on which messages etc., can be displayed; a processing circuit, the processing circuit being operatively connected with the display means in a manner wherein signals which are supplied to the display means can be converted into images on the screen; a display control circuit, the display control circuit being operatively connected with the display means for controlling the generation of signals which when supplied to the display means induce various messages which prompt selected data input; keyboard means operatively connected with the processing circuit and the display control circuit for generating input data signals which are fed to the processing circuit and/or the display control circuit, the method featuring the steps of: producing signals indicative of the current labor rate; inputting the type of panel which is damaged; inputting the amount of area which requires repainting; inputting the number of different colored paint which is required; converting the inputted data relating to the type of panel, the area and the colors, in the processing circuit into a signal representative of a time value; modifying the time signal with the signal indicative of the current labor rate to produce a signal indicative of monetary repair cost.

A fourth aspect of the present invention is deemed to comprise a device for generating repair data for a vehicle body having damaged members, the device featuring: display means, the display means having a screen on which messages etc., can be displayed; a processing circuit, the processing circuit being operatively connected with the display means in a manner wherein signals which are supplied to the display means can be converted into images on the screen; a display control circuit, the display control circuit being operatively connected with the display means for controlling the generation of signals which when supplied to the display means induce various messages which prompt selected data input; keyboard means operatively connected with the processing circuit and the display control circuit for: inputting first data signals to the processing circuit relating to the damage extent in response to a first message displayed on the screen, the damage extent input signals including the separate input of data signals pertaining to large, intermediate and small deformations; inputting second data signals to the processing circuit indicative of the degree of difficulty of each repair operation in response to a second message displayed on the screen; inputting third data signals to the processing circuit indicative of the area of each of the large, intermediate and small deformations in response to a third message displayed on the screen; the processing circuit being so constructed and arranged as to process the inputted first, second and third data signals using to derive a signal indicative of the length of time required to effect the repairs; inputting a fourth signal indicative of the current labor rate to the processing circuit from the keyboard means in response to the display control circuit issuing signals to the display means in manner to induce a fourth message to be displayed on the screen; processing the inputted labor rate signal in combination with the time indicative signal in the processing circuit to generate a signal indicative of the cost of effecting the repairs, the cost indicative signal being supplied to the display means in a manner to induce the result to appear on the screen.

A fifth aspect of the present invention is deemed to comprise a device for generating repair data for a vehicle body having damaged structural members, the device comprising: display means, the display means having a screen on which messages etc., can be displayed; a processing circuit, the processing circuit being operatively connected with the display means in a manner wherein signals which are supplied to the display means can be converted into images on the screen; a display control circuit, the display control circuit being operatively connected with the display means for controlling the generation of signals which when supplied to the display means induce various messages which prompt selected data input; keyboard means operatively connected with the processing circuit and the display control circuit for: inputting first data signals to the processing circuit relating to the damage extent in response to a first message displayed on the screen, the damage extent input signals including the separate input of data signals pertaining to large, intermediate and small deformations; inputting second data signals to the processing circuit indicative of the degree of difficulty of each repair operation in response to a second message displayed on the screen; inputting third data signals to the processing circuit indicative of the area of each of the large, intermediate and small deformations in response to a third message displayed on the screen; inputting a fourth signal indicative of the amount of time inspection and checking of the rectification of the damages structural members to the processing circuit from the keyboard means in response to the display control circuit issuing signals to the display means in a manner to induce a fourth message to appear on the screen; the processing circuit being so constructed and arranged as to process the inputted first, second and third data signals using to derive a signal indicative of the length of time required to effect the repairs; inputting a fifth signal indicative of the current labor rate to the processing circuit from the keyboard means in response to the display control circuit issuing signals to the display means in manner to induce a fifth message to be displayed on the screen; and processing the inputted labor rate signal in combination with the time indicative signal in the processing circuit to generate a signal indicative of the cost of effecting the repairs, the cost indicative signal being supplied to the display means in a manner to induce the result to appear on the screen.

A sixth aspect of the present invention is deemed to comprise a device for generating repair data for a vehicle body having damaged members, the device featuring: a display unit, the display means having a screen on which messages etc., can be displayed; a processing circuit, the processing circuit being operatively connected with the display unit in a manner wherein signals which are supplied to the display unit can be converted into images on the screen, the processing circuit including a memory in which a plurality of chassis types and component members are recorded; a display control circuit, the display control circuit being operatively connected with the display unit for controlling the generation of signals which when supplied to the display unit induce various messages which prompt selected data input; keyboard unit operatively connected with the processing circuit and the display control circuit for: inputting first data signals to the processing circuit relating to the type of chassis of the vehicle in response to a first message displayed on the screen of the display unit; reading out a list of chassis members from the memory in accordance with the inputted chassis type data signals; generating display control signals which are fed to the display unit to induce the list of chassis members to be displayed on the screen; inputting signals indicative of the damage extent to selected panels from the list in response to a second message displayed on the screen, the damage extent input signals including the separate input of data signals pertaining to large, intermediate and small deformations; inputting second data signals to the processing circuit indicative of the degree of repainting required for each panel response to a third message displayed on the screen; inputting third data signals to the processing circuit indicative of the area of each of the large, intermediate and small deformations in response to a fourth message displayed on the screen; inputting fourth signals indicative of the number of different colored paint which will be required for the repainting to the processing circuit in response to a fifth message displayed on the screen; inputting fifth signals indicative of the type of paint required for the repainting in response to a sixth message displayed on the screen; the processing circuit being so constructed and arranged as to process the inputted first, second, third, fourth and fifth data signals to derive a signal indicative of the length of time required to effect the repainting; inputting a sixth signal indicative of the current labor rate to the processing circuit from the keyboard means in response to the display control circuit issuing signals to the display unit in manner to induce a seventh message to be displayed on the screen; and processing the inputted labor rate signal in combination with the time indicative signal in the processing circuit to generate a signal indicative of the cost of effecting the repairs, the cost indicative signal being supplied to the display means in a manner to induce the result to appear on the screen.

BRIEF DESCRIPTION OF THE DRAWINGS

FIG. 1 shows the chart discussed in connection with the prior art in the opening paragraphs of the instant disclosure;

DETAILED DESCRIPTION OF THE PREFERRED EMBODIMENTS

Figure 2A:
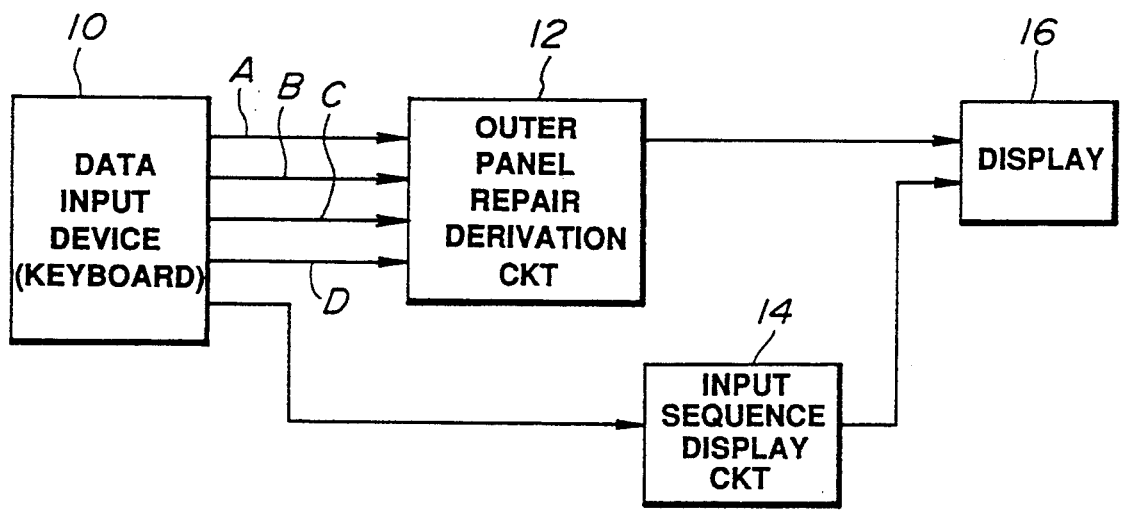
FIGS. 2A and 2B show, in block diagram form, the conceptual arrangements of the hardware involved in processing the data signals produced in accordance with two embodiments of the present invention.
Figure 2B:
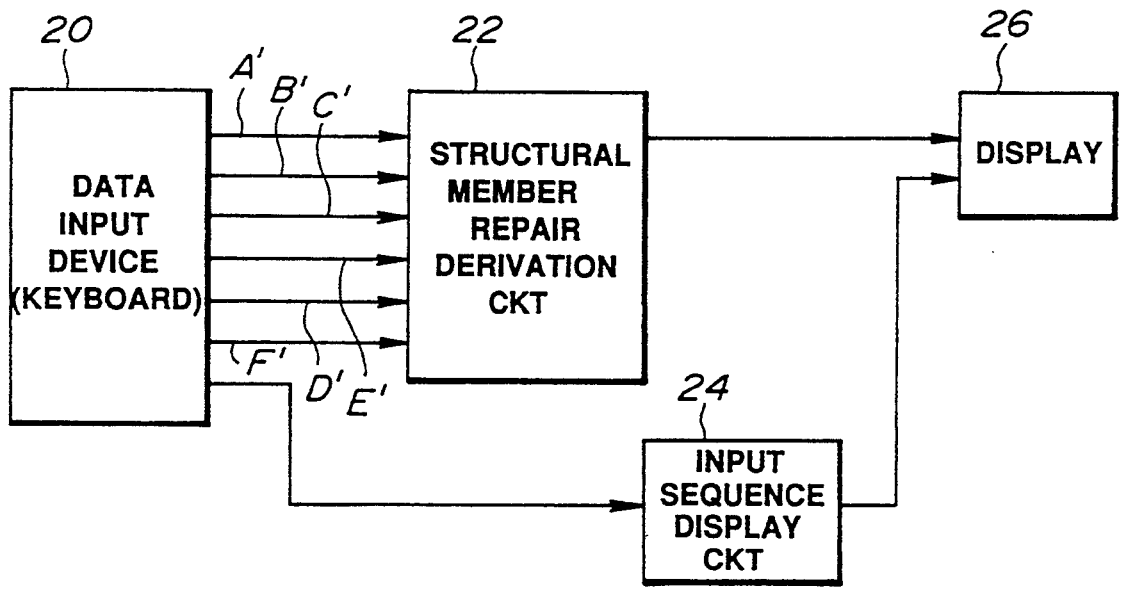

FIGS. 2A and 2B show, in schematic block form, characteristic circuit arrangements via which the various embodiments of the invention can be implemented.

The first circuit arrangement is such that an input device or interface 10, such as a keyboard, is arranged so that the required data input is achieved by depressing the keys and selectively generating signals A.D. These signals are supplied to processing circuit which in this instance is adapted to act as an outer panel repair derivation circuit 12.

In this arrangement signal A denotes the degree of the deformation and is arranged to have three levels which respectively indicate three deformation degrees large, intermediate and small; signal B denotes the degree of difficulty, signal C denotes the area of damages portion, and signal D denotes the current labor rate.

A display control circuit 14 is operatively connected between the input device 10 and a display 16, and is arranged to produce signals which are fed to the display 16 in response to the various inputs made at the input device 10. These signals induce messages to appear in a selected order on the screen of the device, indicating what information or input should be provided or made next, and/or what commands or decisions should be made.

In this instance the display 16 takes the form of a liquid crystal type screen of the type commonly provided on pocket type computers and calculators and which place relatively small load on the batteries used to power the device.

It is within the scope of the present invention to arrange the various embodiments thereof, in the form of a pocket type computer which includes a RAM, ROM CPU and interfaces as is normal; and which is also provided with a ram card interface which permits cards (RAM) to be interchangeably inserted and thus expand the number of different programs which can be run and/or expand the complexity and extent to which various calculations and signal data can be processed.

As these ram cards are extremely light and compact they can be carried in a suitable container such as a money wallet, shirt pocket or the like. For example only, in order to allow the invention to be applied to a wide variety of different vehicles, ranging from motor cycles to buses and trucks of various makes and sizes, a number of cards can be prepared and the important programs and data rendered "read only" in a manner to prevent accidental erasure or damage. The various other alternatives and/or modifications which can be made will become apparent as the disclosure proceeds.

Merely by way of example, the above mentioned hand held computer can take the form of a PC-1360 manufactured by the Sharp Corporation of Osaka Japan.

The outer panel repair derivation circuit (processing circuit) 12 is arranged to process the data signals A–D fed thereto from the key board (input device 12) and to derive the amount of time require to effect re-shaping of the panels and repaint of the same. This result is then used in combination with the signal indicating the instant labor rate to generate an output signal having a value indicative of the cost which will be incurred by the repair operations.

FIG. 2B shows a second possible circuit configuration via which the present invention can be implemented. This arrangement is such as to be essentially the same as the first one and differs basically in that the structural repair circuit (processing circuit) 22 is arranged to receive six different data signals A' to F'.

In this instance signal A' is arranged to represent the deformation degree of a structural member, such as that which forms part of the vehicle chassis and which require bending, straightening and/or the reforming reforming in a manner to return it to its original dimensional specifications and ensure the appropriate wheel alignment etc.

As will be appreciated, in the event of even a relatively minor accident it is possible that the chassis defining members and panels of the vehicle will be twisted or otherwise deformed in a manner which requires repair. In other cases the damage may be so extensive as to demand replacement, however in other cases such may not be readily possible without a large amount of time and effort being spent. Repairing the existing panels or members under such circumstances is deemed economical in terms of parts and labor and is becoming increasingly popular in various countries.

Signal B' is indicative of the degree of repair difficulty, viz., represents rectification degree (viz., distances and lengths by which the panels must be bent or straightened in order to return it to its original configuration); signal C' is indicative of the amount of area that is involved; signal D' is indicative of the amount of time the measuring operations which check the precision of the repair will take; signal E' is indicative of the time required for straightening operations to return the frame to its original form; and signal F' is indicative of the current labour rate.

It will be understood that the signal indicative of the degree of deformation, the degree of repair difficulty and the area are inputted for each of the deformed portions.

The processing circuit 22 of course includes a memory (e.g. a RAM or the like) in which the data supplied thereto from the input device 20 is storable.

The display control circuit 24 is this instance is arranged to function in a manner essentially similar to that described above in connection with #14. Viz., this circuit is arranged to produce a series of signals which are fed to the display 26 in a manner to induce the same to display messages pertaining to what data should be inputted next or what commands and/or decisions are required.

The above mentioned input device 20, and associated circuits in the instant invention comprise a pocket computer which includes a CPU, a RAM, ROM and a multiline liquid crystal display which is operative connected with the CPU (viz., a device such as the PC-1360 mentioned above).

As will be appreciated, although the two above described basic embodiments have been disclosed as individual arrangements, this disclosure has been given simply to highlight the basic deferences and characteristics of the two, and both can be, and from a point of practicality are preferably, included in a single computer of the above described pocket type type.

The definitions set forth in Table 1 and Table 2 below are a guide as to how to interpret the damage and to promote uniform judgements and data input by different operators.

TABLE 1
DEFORMATION DEFINITIONS

LARGE DEFORMATION:
A deformation which is located between more than two flat surfaces, which is deep and has sharply angled concavities or convexities.
INTERMEDIATE DEFORMATION:
A sharply angled deformation which includes small sharply angled portions and which includes more than two small concavities or convexities.
SMALL DEFORMATION:
Small concavities or convexities of the degree which can be rectified using heat treatment or filler

TABLE 2
REPAIR DIFFICULTY DEFINITIONS

(A) CLASS 1: DAMAGED SECTIONS CAN/CANT BE REPAIRED FROM THE INNER SIDE
  U = 0: Can be repaired from the inner side.
  U = 1: Can be repaired from the inner side but includes difficult portions which either cannot be reached or are located so that hands cannot be easily manipulated.
  U = 2: Cannot be repaired from the inner side
(B) CLASS 2: REPAIR OF INTERCONNECTING PANELS/MEMBERS NECESSARY
  A = 0: Not line or edge portions - adjacent interconnecting panel/member not necessary.
  A = 1: Damaged portion lies on a edge or line.
  A = 2: Repair of interconnecting panel/member necessary.

It should be noted that in the above list of definitions, the area of each deformation is defined in terms of 1 $dm^2$ area units: This unit is approximately the size of the adult human hand. Accordingly, it is possible for the operator to use his own hand or hands to judge the area of the deformations when making an appraisal of the damage. Further, in connection with the first and second classes of the repair difficulty U and A a method of determining the same which is set forth hereinlater, can be used.

Figure 3:
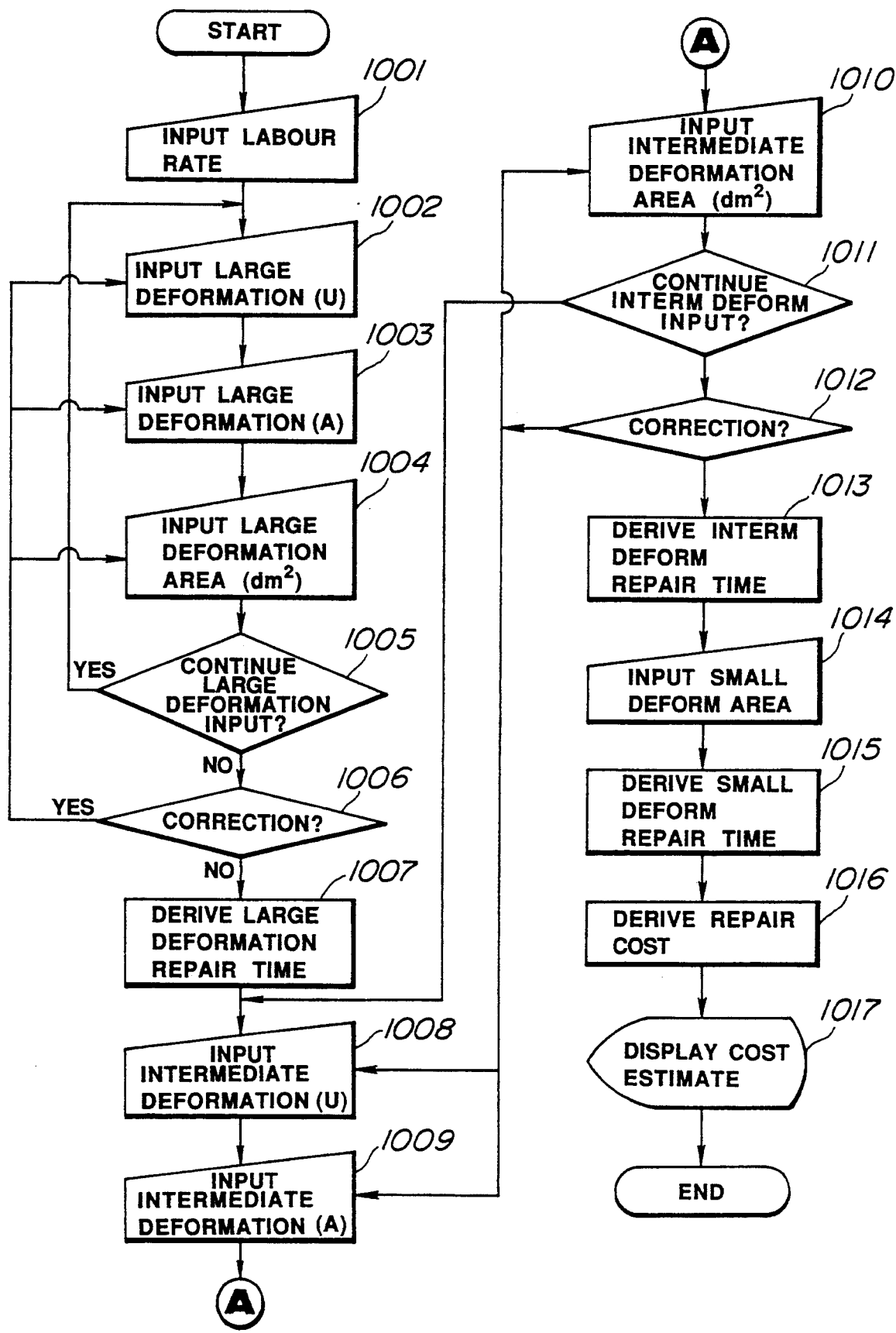
FIGS. 3 to 6 are flow charts which depict the characteristic signal generation steps and processing operations which are carried out in accordance with the various embodiments of the present invention.

The flow chart shown in FIG. 3 depicts the steps which characterize the operation of a first embodiment of the present invention.

As shown, the first step 1001 of the routine is such as to call for the current or local labor rate to be inputted.

In order to carry out this operation, the operator is required to push a suitably designated key which is arranged to generate a signal which conditions the hand held computer to accept data input beginning with the labor rate. Following this, signals are supplied to the liquid crystal display which induces a message requiring the operator to type in a predetermined (security) pass word before actual input can begin, is displayed.

Steps 1002 to 1007 are such as to sequentially produce signals which call for and stare, the input of data relating to the large deformations. As will be understood, input is made indicating the U and A rectification difficulty degrees and the area for each of the large deformations. In the case in which several such deformations have occurred it will be necessary to recycle through each of the steps 1002 to 1005 before the program can flow to step 1007 wherein the total amount of time required for the rectification of the large deformations can be calculated.

As mentioned above, the area of the deformations can be judged using the operators hand as a unit size while the values of U and A are determined based on the definitions set forth in the list of definitions above.

In the case of an erroneous data input, step 1006 is arranged to permit correction of the same and thus obviate the need to restart the process in the event of a typing error, or in case the operator feels that the data inputted has not correctly reflected the actual situation.

At step 1007 the data input is treated in accordance with the equation set forth below:
Viz.,:

$$Td = \{20 + 10 \times (U+A) \div 4\} \times B \qquad (1)$$

wherein:
Td denotes the amount of time required for the large deformation(s) repair in minutes;
B denotes the total area of the large deformations;
20 denotes a factor which denotes a minimum possible repair time in minutes; and
10 and 4 are constants which have been selected based on empirical data in order to suitably modify the inputted values of U and A into time units (minutes).

At steps 1008 and 1013 data input signals pertaining to the intermediate types of the deformation are inputted and suitably treated. That is to say, in accordance with the definition of an intermediate type deformation set forth in the above list, the operator makes judgements and accordingly inputs the appropriate values through the keyboard. These series of steps are essentially the same as 1002 to 1007 and differ in that at step 1013, the amount of time required to effect repair is derived using the following equation:

$$Th = \{10 + 10 \times (U+A) \div 4\} \times E \qquad (2)$$

wherein:
Th denotes the total amount of time in minutes;
10 denotes a minimum possible repair time; and
10 and 4 denote factors which have selected based on previously recorded data in a manner to modify the values of U and A into time units (minutes).

Following this, the program flows to step 1014 wherein the area B of the small type deformations is inputted and then on to step 1015 wherein a calculation according to equation (3) set forth below is carried out.

$$Ts = 7.5M \qquad (3)$$

wherein:
Ts denotes the total amount of time required to repair the small type deformations;

M denotes the total surface area of the small deformations; and 7.5 denotes a factor which suitably selected to convert the area into repair time in minutes.

At step 1016 a value Pb, indicative of the amount of repair work necessary to repair all of the damage, is calculated.

This calculation involves the summing of Td, Th and Ts, the conversion of the total time in minutes into hours and the use of the current labor rate (L) to derive the cost of the repair in the manner indicated by equation (4):

$$Pb = \{(Td + Th + Ts) \div 60\} \times L \quad (4)$$

At step 1017 the cost is displayed on the liquid crystal display of the hand held computer.

Second Embodiment

Figure 4:
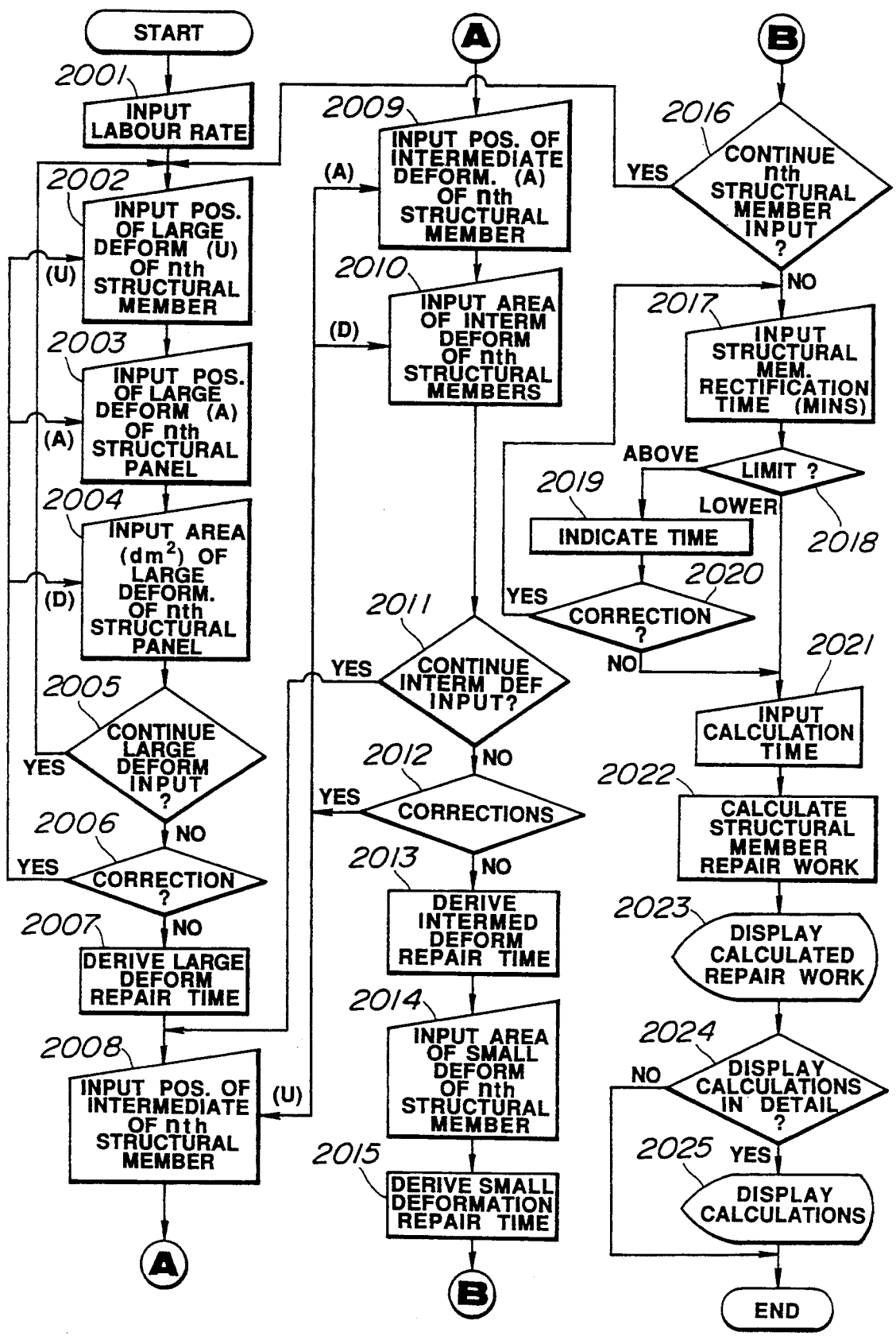

FIG. 4 shows in flow chart form a second embodiment of the present invention. This embodiment is characterized by the compiling of data relating to the cost of repairing the structural members and panels which make up the chassis and which cannot necessarily be observed from outside of the vehicle as contrasted with the external panels.

In this instance also, the hand held computer is arranged to display messages on the liquid crystal screen indicating what input is required. In accordance with the data actually inputted in response to the displayed message the hand held computer is programmed to accept the data and to suitably record the same.

The first step 2001 of this routine is such as to require the input of the current labor rate. Following this, at steps 2001 to 2007 data signals pertaining to the large scale deformations of the structural members are generated and subsequently stored in memory ready for further processing. In this embodiment data relating to the positions of the deformations on the chassis structure are recorded. For example, the first position which is recorded can be the R.H. front side member.

The operator systematically moves about the vehicle inspecting the damage and inputting data relating to the severity and the extent of the damage. During this process, the operator makes appraisals and inputs A and U type data and the area (in dm² area units). As mentioned previously, one area unit can be taken to be approximately the size of the adult human hand.

After the recording of the data relating to the first damaged structural member is finished, the data relating to the next member can be inputted. For example, depending on if there is more than one damaged section in a single member, the operator elects in response to the message displayed at step 2005 to continue input or go on to the next stage. In the event that further input is deemed necessary, the routine recycles to step 2002. On the other hand, if no further input is deemed necessary the routine proceeds to step 2006 wherein an opportunity to make any corrections to the recorded data that may be considered in order.

At step 2007, the data recorded in steps 2002 to 2004 is processed in a manner to derive the total time required to effect repair of the damage portion(s) of the structural member under consideration. In this embodiment the calculation is carried out using equation (5).

$$Fd = \{20 + 10 \times (U+A) \div 4\} \times (1 - œ) \times B \quad (5)$$

wherein:

Fd denotes the amount of time for the repairs in minutes;

20 denotes the minimum base time;

10 and 4 denote factors which are used to convert the values of U and A into time (minutes);

œ denotes a large deformation reduction ratio (e.g. 0.2); and

B denotes the area of the deformation.

It will be noted that the above mentioned deformation reduction ratio œ reduces with the area of the damaged portions and the amount of correction which is required to the chassis framework. This factor is selected in accordance with information contained in a large data ban and is designed to appropriately reduce the outcome of the calculation in a manner which increases the accuracy thereof.

In this embodiment œ is set at 20% for large deformations, 10% for intermediate ones and 0% for small deformations. These values are preset in the memory of the hand held computer.

At steps 2008 to 2013 data signals relating to the severity and extent of the intermediate type damages to the structural arrangement of the vehicle body.

At step 2013 the amount of time required for the intermediate level damages is derived. In this instance the data signals are processed according to equation (6).

$$Fh = \{10 + 10 \times (U+A) \div 4\} \times (1 - ß) \times E \quad (6)$$

wherein:

Fh denotes the amount of time in minutes;

10 denotes a minimum base time;

10 and 4 denote factors which convert the values of U and A into time (mins);

ß denotes a reduction ratio (in this case 0.1); and

E denotes the amount of area of the damaged portion(s).

At step 2014 the area of the small deformations are inputted and at step 2015 the amount or repair time is calculated using equation (7).

$$Fs = 7.5 \times M \quad (3)$$

wherein:

7.5 denotes amount or repair time per unit area of damaged surface; and

M denotes the total surface area which requires repair.

Following this, at step 2016 a message is displayed indicating that the operator should now move on to the next damaged member. If there are no further members to consider, the routine goes on to step 2017 wherein the total time required for the rectification of the structural members taken into consideration is loaded into a suitable section of the memory suitable for further calculation. Merely by way of example, if the total time comes to about 180 minutes, the damage can be considered to be extensive, while if in the order of 120 minutes, the damage can be deemed to be of intermediate extent. Minor damage is indicated by a time value of 60 minutes or less.

However, in the event that the calculated time exceeds a predetermined value, for example 210 minutes, the damage can be considered to be abnormally extensive. Accordingly, at step 2018 the total amount of time which is loaded in step 2017 is compared with a predetermined value (indicative of the above mentioned value) and in the event that the total is above the limit, the routine flows to step 2019 wherein a message cautioning the operator and suggesting rechecking, is induced to appear on the display. At step 2020 a message is displayed giving the operator an opportunity to effect corrections to the time in the event that such is deemed to be in order.

In the event that it is elected to modify, the routine loops back to step 2017 wherein the loaded time value can be reduced.

On the other hand, if the time is considered appropriate then the operator can elect to proceed to step 2021 wherein the instant time value is set for purposes of further calculation.

It will be noted that in some cases structures which serve to mount devices such as suspensions and the like can be replaced, however even in this case it is still possible that, similar to the cases where replacement is impossible, perfect alignment may not be achieved and operations such as wheel alignment and other corrective measures will have to be implemented.

As the time require to check and/or make final corrections of the nature just mentioned, can be quite long, such a time period should be included in order to achieve an accurate time estimate. Accordingly, at step 2021, the time required for measuring and checking is added to the time value thus far derived.

In accordance with the instant embodiment, one or a number of time units can be added (e.g. one unit=10 mins) for each of the damaged structural members involved. This obviates the tendancy for an operator to make a lump sum type-guess and improves the uniformity of the estimate.

After adding an appropriate number of time units to cover the various checking operations and the like that will be required following the actual repair operations, the routine is advanced to step 2022 wherein the cost for the repair is carried out.

In this instance, the calculations are performed for each of the damaged structural members in turn. For example, in connection with the nth member (e.g. the first panel is denoted by X1) equation (8) is firstly applied.

$$X1 = Fd + Fh + Fs \quad (8)$$

following this, equation (9) is used $$FX1 = \{Q \times X1 \div (Y + X1) + K1 + X1\} \div 60 \times L \quad (9)$$

wherein:

FX1 denotes the cost of the first panel;
Q denotes the amount of time required to effect the panel beating for the whole vehicle;
Y denotes the repair time of panels other the first structural member per se; and
K1 is the time required to check the precision of the repair of the first member.

It will be noted that the "$Q \times X1 \div (Y + X1)$" portion of equation (9) is such as to derive the fraction of the total time taken up by the first panel. As an alternative to equation 9 it is possible to execute the calculation using equation (10).

$$FX1 = \{Q1 + K1 + X1\} \div 60 \times L \quad (10)$$

In other words it is possible to calculate the cost of each member individually.

In order to derive the total cost TFX, the costs of each of the individual panels FX1, FX2, . . . FXn are summed using equation (11).

$$TFX = FX1 + FX2 + \ldots + \ldots FXn \quad (11)$$

At step 2023 the result of the calculations is displayed. At step 2024 the routine induces signals to be fed to the display which induce a "display calculations in detail ?" message. If it is desired that all of the calculation data be suitably displayed then the routine is induced to go to step 2025.

Third Embodiment

Figure 5:
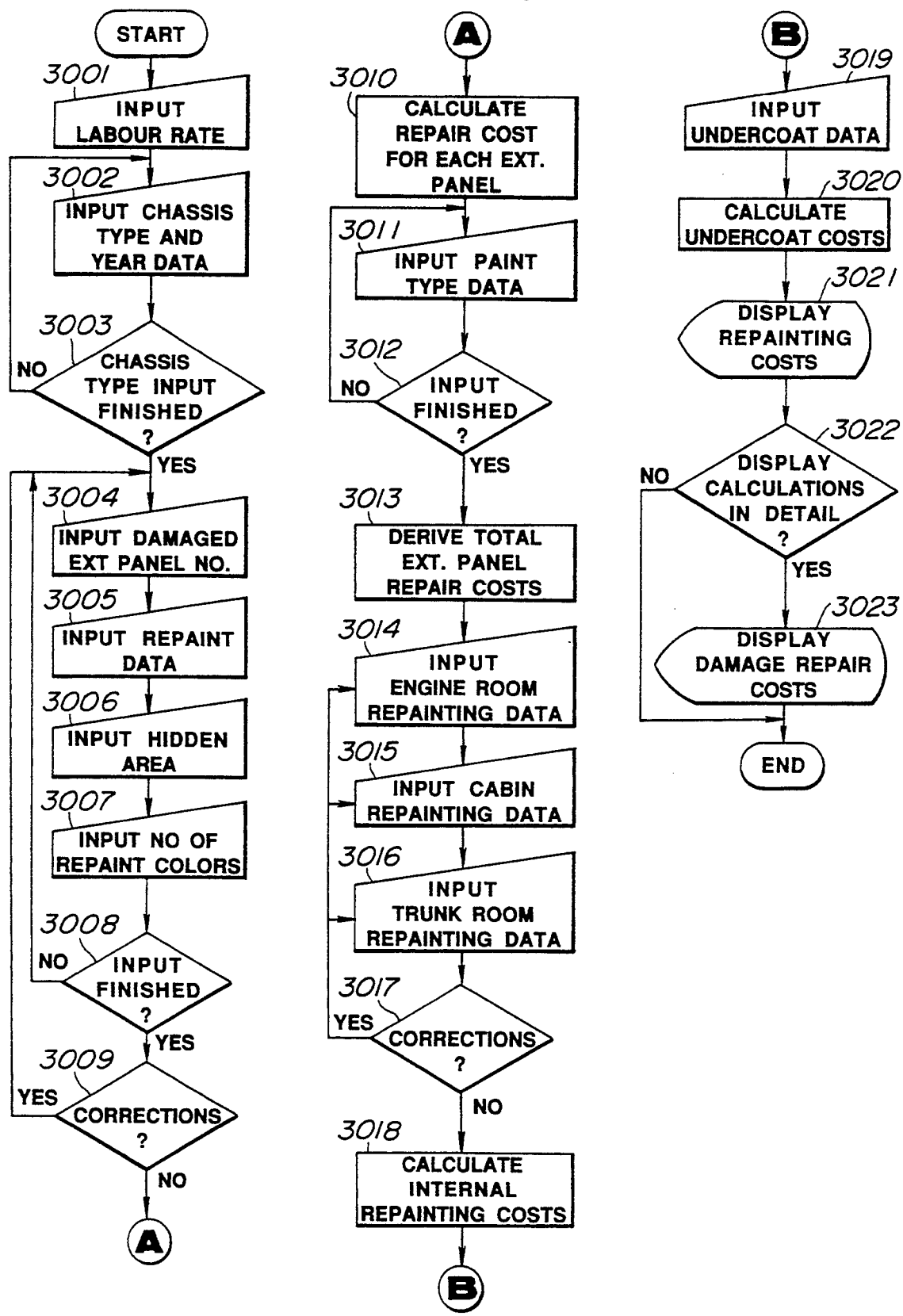

FIG. 5 shows in flow chart form the operation which characterizes a third embodiment of the present invention. This embodiment features the compilation of data pertaining to repainting operations and the costs incurred thereby.

At step 3001 the current labor rate is called for and the appropriate value inputted via the keyboard. At step 3002 the routine generates a message on the screen of the hand held computer calling for the type and year of the vehicle involved. This data includes the chassis number and other data which is necessary to identify the instant vehicle.

In response to this the routine fetches the appropriate list of panel data from the memory and/or calls for the appropriate RAM card to be inserted if not found.

At step 3004 the damaged panels are identified by number. By way of example only, the following type of number-panel correspondence in Table 3 can be set in memory and displayed on the screen of the hand held computer. By scrolling along the list the operator can identify which numeral identifies which panel and suitably input the data. As the various techniques in which this selection can be made will apparent to those skilled in the computer and programming arts, no further disclosure will be given for brevity.

TABLE 3

| No. | PANEL |
|---|---|
| 1. | FRONT BUMPER |
| 2. | HOOD |
| 3. | FRONT FENDER |
| 4. | COWL TOP PANEL |
| 5. | FRONT APRON |
| 6. | ROOF PANEL |
| 7 | FRONT DOOR |
| 8. | REAR DOOR |
| 9. | REAR FENDER |
| 10. | REAR BUMPER |
| 11. | TRUNK LID |
| 12. | REAR UPPER PANEL |
| 13. | REAR LOWER PANEL |
| 14. | BACK DOOR |
| 15. | REAR SIDE SHIELD |
| 16. | SIGHT SILL |

At step 3005 repaint data is called for. This data includes the damage area and the degree to which it is possible to repaint for each of the damaged panels.

It should be noted that, as with the present invention the data input is made for each panel and the size and nature of the panel is already logged in memory and the list can be scrolled over, the task of compiling this data is relatively easy. At step 3006 the area which requires repainting and which is not visible from outside the vehicle is compiled. The inner panels are filled with putty or similar filler after the external panels have been repaired. Accordingly, this area and the cost of the filler needs to taken into account in order to arrive at an accurate result. In the case that connected inner panels are involved the same system of area assessment is applied. For example, 1 dm² units are used in a manner similar to the previous embodiments.

In step 3007 the number of different colors involved is inputted. At step 3008 it is determined if all of the panels and areas have been recorded or not. In the event that the input is finished the routine then presents an opportunity for data correction at step 3009.

At step 3010 the cost of repainting each of the external panels is calculated. This calculation is performed in the instant embodiment using the following series of equations (12)-(15):

$$Ph = œ \times 10 \times \sqrt{A} \times 1.3 \times 1.11 \tag{12}$$

$$Bs = 10 \times \sqrt{C} \times 1.3 \tag{13}$$

$$Yz = R1 \times 10 \times \sqrt{A} + R2 \tag{14}$$

$$X = (Ph \div 60 \times L + Yz) \times (B \div 100) \times D + Bs \div 60 \times L \tag{15}$$

wherein:
A denotes the area to be re-painted;
œ denotes a factor which varies with the value of A
It should be noted that is such as to vary with the area to be repainted in a manner wherein if A is in the range of 5-10 dm² then varies between 0.7 to 1.4;
1.3 denotes a surplus ratio;
C denotes the hidden area inputted in step 3006;
R1 denotes a factor relating to the cost of the paint and which can have a 25 degree range by way of example;
R2 denotes the cost of additional paint materials, under normal circumstances this factor is zero;
B denotes the repainting extent (%) inputted in step 3005;
L denotes the labor rate inputted in step 3001; and
D denotes the number of colors (inputted in step 3007)—in the case of a single color D=1 in the case of two D=1.1.

This series of equations are applied to each of the panels in turn thus enabling the compilation of data X1, X2, X3, ... Xn.

At step 3011 a factor μ relating to the type of paint involved, for example solid or metallic and the use of lacquer, urethane or pearl finish. Depending on the type of paint(s) involved this factor varies between 1 and 1.4. At step 3012 it is determined if the input relating to the above mentioned factor μ is finished or not. Following this at step 3013 the following equation is used to determined the total external panel repainting Gty.

$$Gty = \{Mx + (Tx - Mx) \times \partial\} + (Jc \times L) \times m + (SM \times L-) + Ku \tag{16}$$

wherein
Tx is the individual materials cost for each of the panels;
∂ is a continuity factor having value of 0.9 for example;
Jc denotes a standard preparation time for each color—for example 1.2 hrs; and
Ku is a monetary cost which relates to the additional black paint which must be added to various portions of the vehicle body such as sashes and fenders.

At steps 3014 to 3019 data signals relating to the repainting of the interior panels is inputted and suitably processed.

In this section of the routine the data pertaining to the engine compartment, the vehicle passenger compartment and the trunk are individually inputted. As in the previous cases, the data for each of the panels is developed individually and summed (K1, K2 ... Kn). Equations 17 and 18 are used.

$$K = U \times (Z \div 100) \times L \tag{17}$$

$$Tk = Mk + (Tk - Mk) \times \partial \tag{18}$$

In these equations the value of U varies with the type of undercoat. Viz., by way of example, in the case of the engine compartment U=1.9 while in the case of the vehicle interior U=1.0 and in the trunk U=1.1. Further, Z in this case denotes the values indicating the extent of repainting required for each panel inputted in steps 3014 to 3016; Mk denotes a value relating to the undercoating which indicates the expense of the original one; Tk denotes the total cost for each of the individual undercoatings; and ∂ denotes a continuity factor having a value of 0.9 by way of example.

In step 3019 data relating to the undercoat is supplied. Viz., in this step the number H of panels which need to be undercoated in addition to the damaged ones is inputted. Following this, at step 3020 the undercoating cost is derived using equation (8) set forth hereunder.

$$Ad = \{1400 + 800 \times (H - 1)\} \times L \div 5000 \tag{8}$$

wherein:
1400, 800 and 5000 factors are included to modify the value of H in a manner to indicate a practical monetary value.

At step 3021 the Gty, Tk and Ad are displayed and at step 3022 a message generated enquiring if it is required that all of the calculations be displayed in detail or not. Depending on the response to this message, the program flows either the to end or to step 3023.

FOURTH EMBODIMENT

Figure 6:
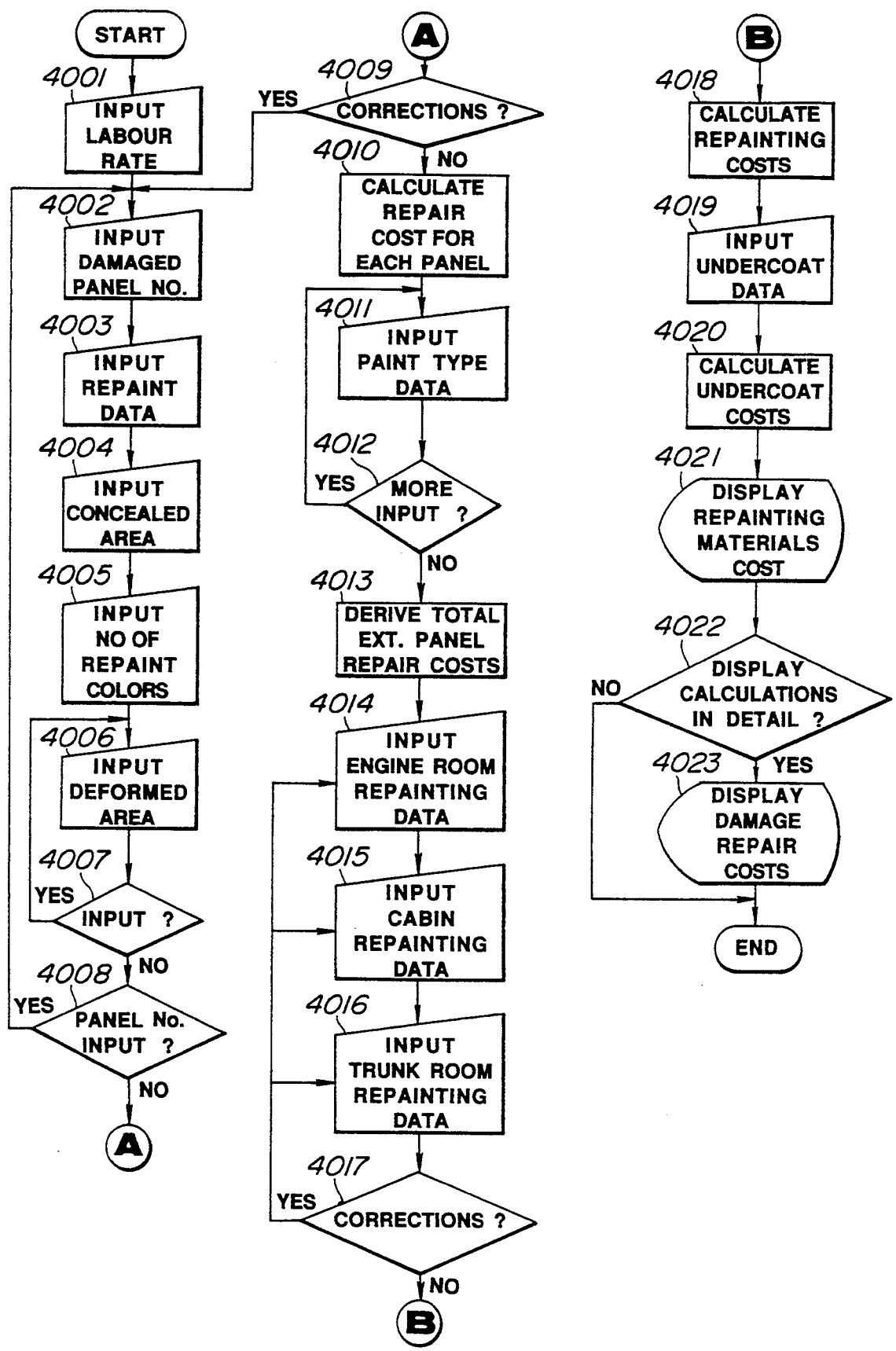

FIG. 6 shows a fourth embodiment of the present invention. As will be appreciated this embodiment is essentially similar to the one shown in FIG. 5 and differs in that the steps of identifying the chassis type has been omitted. This of course permits a large reduction in the amount of data that must be prestored and recorded in a suitable ROM type memory and thus facilitates application to hand held computers having limited RAM capacity.

ALTERNATIVE ARRANGEMENTS

Figure 7:
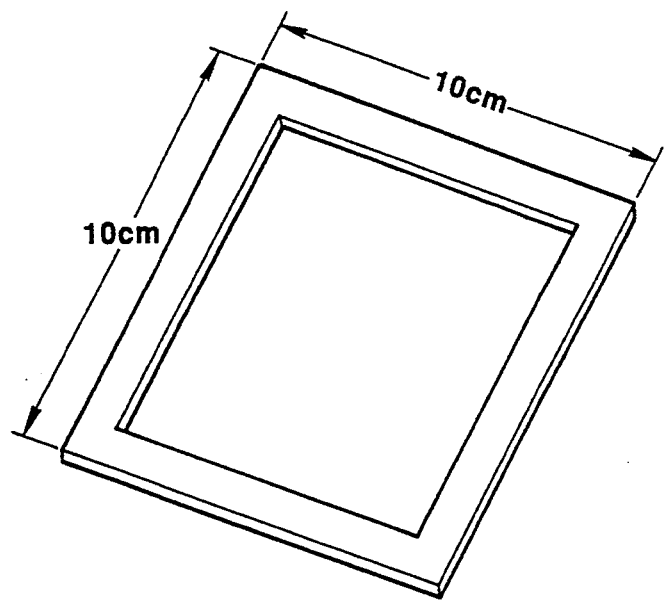
FIG. 7 is a perspective view of a template-like instrument which can be used in connection with the present invention in order to estimate the area of a given deformed panel.

FIG. 7 shows a simple device which can be used to judge the size of the damaged area. This arrangement comprises a rubber template type arrangement which can be placed on the vehicle body and/or moved from place to place therealong in a manner which enables the number of 1 dm² area units which are involved in the damage to be easily determined. This type of device is particularly useful in the event that the operator tends to have excessively large or small hands which tends to hinder accurate usage of a "hand" area. This type of template can advantageously be made of a magnetic plastic which adheres to the surface of the vehicle.

Figure 8:
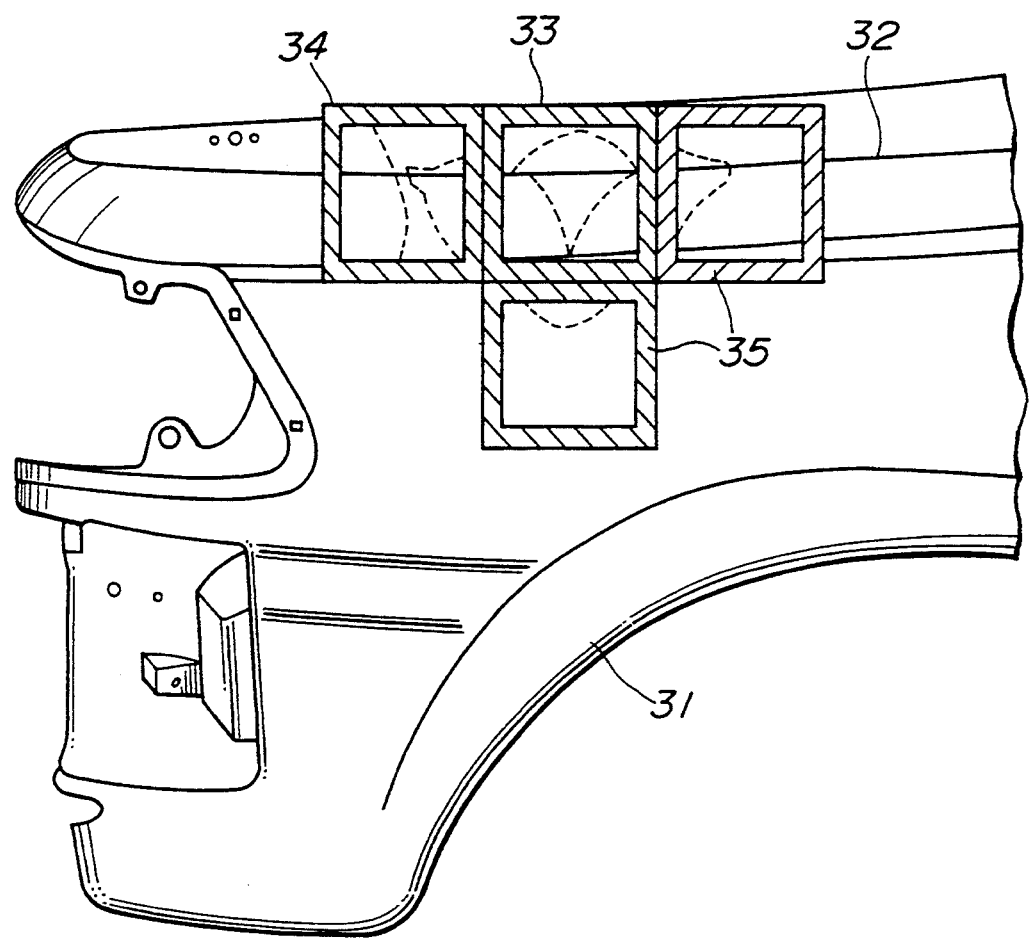
FIG. 8 is a side elevation view showing how the area of a damaged portion of the vehicle can be approximated using a series of color coded area estimating templated similar to that shown in FIG. 7.

A further extension of the above idea is shown in FIG. 8. In this arrangement a plurality of color coded templates are used. In this arrangement red (merely by way of example) templates (33) are used to designate the areas wherein large deformations have occurred while yellow (34) and green (35) ones are used in the case of intermediate and small deformations, respectively.

By firstly applying this type of color coded templates on the vehicle body the task of assessing the external area which has been damaged and the extent to which the damage has occurred, becomes much easier and reduces to a matter of counting the number of templates of each color present.

The various other modifications and extrapolations which can be made to the disclosed embodiments without departing from the scope of the present invention will be apparent to those skilled in the arts of automotive repair and computer programming.

What is claimed is:

1. An interactive method for instructing an estimator for generating repair data for a body having damaged portions, comprising the steps of:

generating and supplying first display signals from a display control circuit to display means, said first display signals inducing messages to appear on said display means prompting input of various data;

inputting first data signals to a processing circuit relating to an extent of damage to said damaged portions in response to a first message displayed on said display means, said first data signals including separately inputted data signals respectively pertaining to large, intermediate and small deformations of each of said damaged portions;

inputting second data signals to said processing circuit indicative of a degree of repair difficulty for each of said damaged portions in response to a second message displayed on said display means;

inputting third data signals to said processing circuit indicative of an area of each of said large, intermediate and small deformations in response to a third message displayed on said display means;

processing said first, second and third data signals to derive a time signal indicative of a length of time required to effect repairs on each of said damaged portions;

inputting a fourth data signal indicative of a current labor rate to said processing circuit in response to a fourth message displayed on said display means;

using said fourth data signal in combination with said time signal to generate a cost signal indicative of a cost of effecting said repairs;

generating and supplying a display control signal from said processing unit to said display means, said display control signal inducing said cost of effecting said repairs to appear on said display means.

2. An interactive method for instructing an estimator for generating repair data for a body having damaged portions, comprising the steps of;

generating and supplying first display signals from a display control circuit to display means, said first display signals inducing messages to appear on said display means prompting input of various data;

inputting first data signals to a processing circuit relating to an extent of damage to said damaged portions in response to a first message displayed on said, display means, said first data signals including separately inputted data signals respectively pertaining to large, intermediate and small deformations of each of said damaged portions;

inputting second data signals to said processing circuit indicative of a degree of repair difficulty for each of said damaged portions in response to a second message displayed on said display means;

inputting third data signals to said processing circuit indicative of an area of each of said large, intermediate and small deformations in response to a third message displayed on said display means;

inputting a fourth data signal indicative of an amount of time for checking and measuring repair of said damaged portions to insure that a required degree of repair has been attained in response to a fourth message;

processing said first, second, third and fourth data signals to derive a time signal indicative of a length of time required to effect repairs;

inputting a fifth data signal indicative of a current labor rate to said processing circuit in response to a fifth message displayed on said screen;

using said fifth data signal in combination with said time signal to generate a cost signal indicative of a cost of effecting said repairs;

generating and supplying a display control signal from said processing unit to said display means, said display control signal inducing said cost of effecting said repairs to appear on said display means.

3. An interactive method for instructing an estimator for generating repair data for a vehicle body having damaged panels with a system comprising display means having a screen on which messages are displayed;

a processing circuit operatively connected with said display means so that signals supplied to said display means can be converted into images on said screen, a display control circuit operatively connected with said display means for controlling generation of signals which when supplied to said display means induce various messages which prompt selected data input, and keyboard means operatively connected with said processing circuit and said display control circuit for generating input data signals for said processing circuit and said display control circuit, said method comprising the steps of:

producing a labor rate signal indicative of a current labor rate;

inputting first data concerning a type of panel which is damaged;

inputting second data concerning an amount of area of a panel which required repainting;

inputting third data indicative of a specific colored paint which is required;

converting, said first, second and third data in said processing circuit into a time signal representative of a time value;

modifying said time signal with said labor rate signal to produce a cost signal indicative of a monetary repair cost.

4. An interactive system for instructing an estimator and for generating repair data for a body of a vehicle having damaged portions, comprising:

display means having a screen on which messages are displayed;

a processing circuit, operatively connected with said display means, for supplying signals to said display means for conversion into images on said screen;

a display control circuit, operatively connected with said display means for controlling generation of signals which when supplied to said display means induce various messages which prompt selected data input; and keyboard means, operatively connected to said processing circuit and to said display control circuit, for inputting first data signals to said processing circuit relating to an extent of damage to said portions in response to a first message displayed on said screen, said first data signals including separately inputted data signals pertaining to large, intermediate and small deformations of said damaged portions, inputting second data signals to said processing circuit indicative of a degree of repair difficulty of each repair operation for each of said damaged portions in response to a second message displayed on said screen, inputting third data signals to said processing circuit indicative of an area of each of said large, intermediate and small deformations in response to a third message displayed on said screen, said processing circuit processing said first, second and third data signals to derive a time signal indicative of a length of time required to effect repairs of said damaged portions, and inputting a fourth data signal to said processing circuit indicative of a current labor rate in response to said display control circuit issuing signals to said display means to induce a fourth message to be displayed on said screen;

said processing circuit processing said fourth data signals in combination with said time signal to generate a cost signal indicative of a cost of effecting said repairs, and to supply said cost signal to said display means to induce said cost to appear on said screen.

5. A device as claimed in claim 4 wherein said damaged portion is an external panel which can be seen from outside of said vehicle.

6. A device as claimed in claim 4 wherein said damaged portion is a structural member of said vehicle, said structural member being a member which cannot be seen from outside of said vehicle.

7. An interactive system for instructing an estimator for inputting requested data and for generating repair data for a body of a vehicle having damaged portions, comprising:

a display control circuit for generating instruction message signals including first message signals containing first information requesting first data pertaining to a category of large, intermediate and small deformations in said damaged portions, second message signals containing second information requesting second data pertaining to a degree of repair difficulty for said damaged portions, third message signals containing third information requesting third data pertaining to areas of said large, intermediate and small deformations in said damaged portions, and a fourth message signal containing fourth information requesting fourth data pertaining to current labor rates;

display means, including a display screen, for responding to said instruction message signals from said display control circuit for displaying said first, second, third and fourth information on said display screen as instructions for said estimator to provide said first, second, third and fourth data as said requested data;

keyboard means to be operated by said estimation for inputting said requested data into said system; and a data processing circuit, responsive to said requested data input into said system from said keyboard means, for calculating a cost of effecting repairs of said damaged portions and outputting a cost signal indicative of said cost;

said processing circuit processing said first second and third data of said requested data to derive a time signal indicating an amount of time necessary to effect repairs of said damaged portions, processing said fourth data of said requested data together with said time signal to calculate said cost of effecting said repairs as said cost signal, and outputting said cost signal to said display means for display of said cost on said display screen as said repair data.

8. An interactive method for instructing an estimator to provide requested data and for providing repair data for a body of a vehicle having damaged portions, comprising:

generating a first message containing first information requesting first data pertaining to a category of large, intermediate and small deformations in said damaged portions;

displaying said first message for said estimator on said display screen and receiving inputted said first data in response to display of said first message;

generating a second message containing second information requesting second data pertaining to a degree of repair difficulty for said damaged portions;

displaying said second message for said estimator on said display screen and receiving inputted said second data in response to display of said second message;

generating a third message containing third information requesting third data pertaining to areas of said large, intermediate and small deformations in said damaged portions;

displaying said third message for said estimator and said display screen and receiving inputted said third data in response to display of said third message;

generating a fourth message containing fourth information requesting fourth data pertaining to current labor rates;

displaying said fourth message for said estimator on said display screen and receiving inputted said fourth data in response to display of said fourth message;

processing inputted said first, second and third data to derive a time indication of an amount of time necessary to effect repairs of said damaged portions and processing inputted said fourth data together with said time indication to derive a cost of effecting said repairs; and displaying said cost on said display screen.

* * * * *